United States Patent [19]

Datta et al.

[11] 4,252,848

[45] Feb. 24, 1981

[54] PERFLUORINATED POLYMER THIN FILMS

[75] Inventors: Pabitra Datta, Cranbury; Grzegorz Kaganowicz, Princeton, both of N.J.

[73] Assignee: RCA Corporation, New York, N.Y.

[21] Appl. No.: 786,458

[22] Filed: Apr. 11, 1977

[51] Int. Cl.[2] .................... B32B 3/02

[52] U.S. Cl. .................... 428/64; 427/41; 428/163; 428/164; 428/422; 428/457

[58] Field of Search .................... 427/41; 428/64, 163, 428/164, 422, 457

[56] References Cited

U.S. PATENT DOCUMENTS

| | | | |
|---|---|---|---|
| 3,518,108 | 6/1970 | Heiss, Jr. et al. | 427/41 |
| 3,663,265 | 5/1972 | Lee et al. | 427/41 |
| 3,940,506 | 2/1976 | Heinecke | 427/41 |
| 4,018,945 | 4/1977 | Mehalso | 427/41 |

FOREIGN PATENT DOCUMENTS 2557899 3/1977 Fed. Rep. of Germany .

OTHER PUBLICATIONS

Chemical Abstracts, vol. 64, 1960 Column 12838

*Primary Examiner*—Bernard D. Pianalto
*Attorney, Agent, or Firm*—H. Christoffersen; Birgit E. Morris; Allen Bloom

[57] ABSTRACT

Thin, stable, low surface energy perfluorinated polymer films can be applied to a substrate by glow discharging the substrate in the presence of a perfluorocycloalkane or -cycloolefin or perfluoroalkyl-substituted derivatives thereof.

6 Claims, 1 Drawing Figure

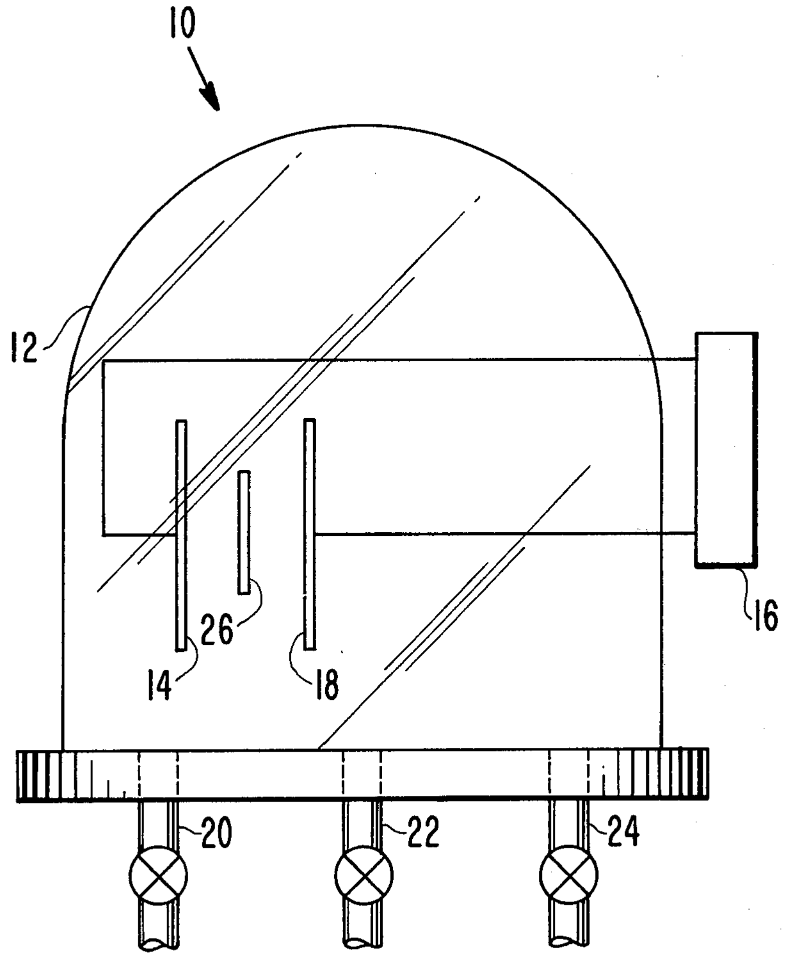
10
12
16
26
14
18
20
22
24

PERFLUORINATED POLYMER THIN FILMS

This invention relates to a method of depositing low surface energy films on a substrate. More particularly, this method relates to a method of depositing perfluorinated polymer films on a substrate.

BACKGROUND OF THE INVENTION

Perfluorinated polymers such as polytetrafluoroethylene are known to have very low surface energy and excellent stability and thus find utility as protective coatings and molded articles where lubricity, stability and low friction surfaces are important. Pure polytetrafluoroethylene, also known as "TEFLON" is difficult to form into thin coatings however, and the polymer must be sintered from granular or powdered particles at high temperatures. This requirement precludes forming thin layers of polytetrafluoroethylene on temperature sensitive substrates. Perfluorinated ethylene-propylene resins have a branched chain molecule and they have a somewhat reduced melt viscosity and melting point which allows these polymers to be processed by extrusion or injection molding. However, none of these processes are used to form thin, conformal coatings on a substrate. Further, perfluoropolymer films do not adhere well to most substrates due to the chemical inertness of these polymers. Thus it would be desirable to find a method of applying a thin conformal perfluorinated polymer film at low temperatures.

SUMMARY OF THE INVENTION

We have found that stable, adherent, thin perfluorinated polymer films can be applied to various substrates at low temperatures by exposing the substrate to a glow discharge in the presence of cyclic perfluorinated monomers.

BRIEF DESCRIPTION OF THE DRAWING

The sole FIGURE is a cross sectional view of apparatus suitable for carrying out the method of the invention.

DETAILED DESCRIPTION OF THE INVENTION

Cyclic perfluorinated monomers suitable for use in the present invention are compounds having a weak carbon-carbon bond linkage which is readily cleaved in the presence of a glow discharge. Such compounds include cycloperfluoroalkanes such as perfluorocyclobutane, perfluorocyclopentane, perfluorocyclohexane and the like; and cycloperfluoroolefines such as octafluorocyclobutene, perfluorocyclohexene and the like; and perfluoroalkyl-substituted derivatives of the above such as perfluoro-1,-3-dimethylcyclohexane, perfluorodimethylcyclobutenes and the like.

When the vaporized monomers are subjected to a glow discharge in a vacuum chamber, a perfluorinated polymer is obtained that has a high stability to elevated temperatures and has a very low surface energy, on the order of about 14–25 dynes/cm. The reaction can be illustrated with the following equation, using perfluoro-1,3-dimethylcyclohexane as an example.

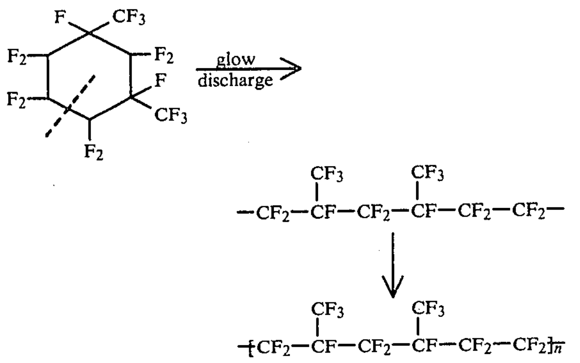

This reaction is very fast and the rate of deposition of the polymers on the substrate is very high, about 2 to 5 times faster than rates of deposition for other polymers which can be formed in a glow discharge, such as polystyrene. The latter process is illustrated in U.S. Pat. No. 3,843,399 to Kaplan et al, wherein deposition rates are on the order of 80–260 angstroms per minute.

It is believed the present rapid deposition rates can be explained in that the cyclic rings open up when subjected to a glow discharge, forming radicals which can rapidly recombine to form long polymer chains. The carbon-fluorine ratio in the films of the present invention are at or near stoichiometric proportions and the polymers are extremely stable. Non-cyclic monomers, on the other hand, fragmentize in a glow discharge. For example, tetrafluoroethylene and perfluoro-1-pentene lose fluorine atoms in a glow discharge; the polymer deposition rate is quite low and the resultant fluorinated polymers have a carbon to fluorine ratio which is much higher than the polymers formed according to the present invention. This leads to fluorinated polymer coatings which are unstable to air and to water.

A glow discharge apparatus suitable for carrying out the coating method is shown in the FIGURE, generally as 10. The glow discharge apparatus 10 includes a vacuum chamber 12, such as a glass bell jar. In the vacuum chamber are two electrodes 14 and 18, which can be a screen, coil or plate of a material that is a good electrical conductor, such as platinum or graphite. The electrodes 14 and 18 are connected to an external power source 16, which may be DC or AC. Thus, there will be a voltage potential between the electrodes 14 and 18. When low pressures and current frequencies other than radio frequencies are used, the plasma is enhanced by means of magnets on the electrodes 14 and 18.

A first outlet 20 into the vacuum chamber 10 allows for evacuation of the system and is connected to a mechanical pump. Second and third outlets 22 and 24 respectively, are connected to gas bleed systems for adding gas as employed in the coating process.

In carrying out the coating process, the substrate 26 to be coated is placed between the electrodes, typically maintained about 5 to 10 cm apart. The vacuum chamber 12 is then evacuated through the first outlet 20 to a pressure of 0.5 to $1\times10^{-6}$ torr. An inert gas, such as argon, may be added to the second outlet 22 to a partial pressure of about 10–30 millitorr. The monomer is added through the third outlet 24 to a partial pressure of about 20–90 millitorr.

A glow discharge is initiated between the electrodes 14 and 18 by energizing the power source 16 when deposition of a polymer on the substrate 26 will begin.

For deposition the current density should be in the range of 1-5 $ma/cm^2$ using 500-1000 volts. Under these conditions, the polymers will be deposited at the rate of about 2-15 angstroms per second.

The present polymer films are useful for many applications wherein a lubricating or low friction coating is desired. For example, the present polymer films can be substituted for a chromium plating for conventional stereo masters to reduce the noise level of stereo record replicas. They can also be employed as mold release coatings for video disc masters described in Clemens U.S. Pat. No. 3,842,194 incorporated herein by reference, since they are stable to the temperatures encountered during polyvinyl chloride molding operations and they adhere well to the metal stamper. They can also be employed as a dielectric film for the video disc, as described in U.S. Pat. No. 3,843,399, referred to above and incorporated herein by reference.

The invention will be further illustrated by the following Examples but it is to be understood that the invention is not meant to be limited to the details described therein. Pressures were measured by a Pirani gauge.

EXAMPLES 1-5

Glass plates were mounted in a vacuum chamber between two electrodes mounted 5 cm apart as in the FIGURE. The electrodes were operated at 10 kilohertz and a current density of 1-5 $ma/cm^2$ at about 1000 volts. The chamber was evacuated to a pressure of $1\times10^{-6}$ torr and backfilled with an inert gas as designated to a pressure of 10 millitorr except where otherwise indicated. The perfluorinated monomers were added to a pressure of 30 millitorr.

Polymer deposition was begun by energizing the electrodes and was continued until a layer about 100-1000 angstroms thick was deposited.

The surface energy of the polymer films on the plates was determined by measuring the contact angle of drops of a variety of solvents whose surface tension is known. The data are summarized below in Table I wherein critical surface energy is designated as $\gamma_c$, the dispersive contribution is designated as $\gamma^d$ and the polar contribution is designated as $\gamma^p$, all in dynes/cm. The data is summarized in Table I below.

TABLE I

| EXAMPLE | MONOMER | INERT GAS | $\gamma_c$ | $\gamma^d$ | $\gamma^p$ |
|---|---|---|---|---|---|
| 1 | perfluoro-1,3-dimethyl-cyclohexane | —* | 17 ± 2 | 14.2 | 0.08 |
| 2 | perfluoro-1,3-dimethyl-cyclohexane | argon | 17 ± 2 | 18.3 | 0.05 |
| 3 | perfluoro-1,3-dimethyl-cyclohexane | nitrogen | 17 ± 2 | 18.5 | 0.1 |
| 4 | perfluorocyclo-hexene | nitrogen | 26 ± 2 | 29.2 | 0.3 |
| 5 | perfluorodi-methyl-cyclobutene | nitrogen | 24 ± 2 | 26.3 | 0.71 |
| Control A** | | | 18 | 18.4 | 1.9 |
| Control B*** | | | 18 | 17.8 | 1.5 |

*80 microns pressure
**perfluorinated ethylene-propylene on quartz
***perfluorinated ethylene-propylene film type L of the duPont de Nemours Co.

Infrared analysis confirmed the structure of the above polymers to be long chain fluorocarbon polymers.

Samples of the above coatings were aged by maintaining at 100° F. for 72 hours and also by exposing to ultra-violet light for 120 hours. The surface energy of the polymers remained unchanged.

EXAMPLE 6

A vinyl disc about 12 inches (30.5 cm) in diameter having a spiral groove on the surface with a pitch of about 5,555 grooves per inch (14,100 grooves per cm) and coated with a trimetal film as described in U.S. Pat. No. 3,982,066 to Nyman et al, was mounted in the vacuum chamber as in the FIGURE and subjected to a glow discharge in the presence of perfluoro-1,3-dimethylcyclohexane monomer as in Example 1. A uniform conformal polymeric film about 300 angstroms thick was applied to the disc. This disc was played back numerous times without wear and without the need for additional lubrication.

EXAMPLE 7

A metal stamper as described in Clemens U.S. Pat. No. 3,842,194, was coated with a film of poly(perfluoro-1,3-dimethylcyclohexane) about 250 angstroms thick prepared as in Example 2.

Over 800 vinyl polymer disc replicas were pressed from the stamper in a conventional injection molding apparatus with no deterioration of the coating or any noticeable effect on the discs.

As a comparison, a similar stamper coated with polytetrafluoroethylene of similar thickness by radio frequency sputtering a teflon target, deteriorated and pulled away from the stamper after a single pressing.

We claim:

1. A method of applying thin, stable, low surface energy polymer films to a substrate which comprises exposing said substrate to a glow discharge in the presence of a gaseous compound selected from the group consisting of perfluorocycloalkanes, perfluorocycloolefines and perfluoroalkyl-substituted derivatives thereof.

2. A method according to claim 1 wherein an inert gas is also present with the gaseous compound.

3. A method according to claim 1 wherein said gaseous compound is perfluoro-1,3-dimethylcylohexane.

4. A method according to claim 1 wherein said gaseous compound is perfluorodimethylcyclobutene.

5. A method according to claim 1 wherein said gaseous compound is perfluorocyclohexene.

6. An information record adapted for use with a playback stylus to effect recovery of signals occupying the bandwidth of at least several megahertz when relative motion and a desired rate is established between said record and said stylus, said record comprising (a) a disc having a spiral groove in the surface thereof, said groove being dimensioned for reception therein of said stylus and containing an information track constituted by geometric variations in the groove, (b) a continuous conductive metal layer on said surface, said layer being of substantially uniform thickness and (c) a thin dielectric coating of uniform thickness overlying said metal layer, said dielectric coating being a perfluorinated polymer applied by glow discharging said metal coated disc in the presence of a gaseous compound selected from the group consisting of perfluorocycloalkanes, perfluorocycloolefines and perfluoroalkyl-substituted derivatives thereof, and wherein the combined thickness of said conductive layer and said dielectric coating do not fill said groove, allowing for reception of said stylus within said groove during playback.

* * * * *